(12) United States Patent
Mantkowski et al.

(10) Patent No.: US 10,100,650 B2
(45) Date of Patent: Oct. 16, 2018

(54) PROCESS FOR SELECTIVELY PRODUCING THERMAL BARRIER COATINGS ON TURBINE HARDWARE

(71) Applicant: General Electric Company, Schenectady, NY (US)

(72) Inventors: Thomas Edward Mantkowski, Madeira, OH (US); John Maynard Crow, Springdale, OH (US); Shawn Michael Pearson, West Chester, OH (US); Stephen Mark Molter, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 941 days.

(21) Appl. No.: 13/724,324

(22) Filed: Dec. 21, 2012

(65) Prior Publication Data

US 2014/0341750 A1 Nov. 20, 2014

Related U.S. Application Data

(60) Provisional application No. 61/666,840, filed on Jun. 30, 2012, provisional application No. 61/666,838, filed on Jun. 30, 2012.

(51) Int. Cl.
*F01D 5/28* (2006.01)
*C23C 4/00* (2016.01)
(Continued)

(52) U.S. Cl.
CPC .............. *F01D 5/284* (2013.01); *B23K 26/36* (2013.01); *C23C 4/00* (2013.01); *C23C 4/18* (2013.01);
(Continued)

(58) Field of Classification Search
CPC B23K 26/36; F01D 5/288; C23C 4/18; C23C 4/00
See application file for complete search history.

(56) References Cited

U.S. PATENT DOCUMENTS 3,964,935 A 6/1976 Wilks
4,050,133 A * 9/1977 Cretella ................. B23P 6/007
148/527

(Continued)

FOREIGN PATENT DOCUMENTS

CA 2282010 A1 3/2000
CN 101331246 A 12/2008
(Continued)

OTHER PUBLICATIONS

Unofficial English Translation of Chinese Office Action issued in connection with corresponding CN Application No. 201380035109.2 dated Oct. 21, 2015.
(Continued)

*Primary Examiner* — Richard Edgar
*Assistant Examiner* — Michael Sehn
(74) *Attorney, Agent, or Firm* — General Electric Company; Brian P. Overbeck (57) ABSTRACT

A process of depositing a ceramic coating on an airfoil component and the component formed thereby is provided. The process includes depositing a bond coat on an airfoil component including on a trailing edge region thereof that defines a trailing edge of the airfoil component, within holes located within the trailing edge region and spaced apart from the trailing edge, and on lands located within the trailing edge region and between the holes. A ceramic coating is then deposited on the bond coat including on the trailing edge region of the airfoil component, within the holes located within the trailing edge region, and on the lands between the holes. The ceramic coating within the holes is selectively (Continued)

removed without completely removing the ceramic coating on the trailing edge region and the lands between the holes.

12 Claims, 6 Drawing Sheets (51) Int. Cl.
*C23C 4/18* (2006.01)
*B23K 26/36* (2014.01)

(52) U.S. Cl.
CPC ........ *F01D 5/288* (2013.01); *F05D 2300/611* (2013.01)

(56) References Cited

U.S. PATENT DOCUMENTS

| | | | |
|---|---|---|---|
| 4,418,124 A | | 11/1983 | Jackson et al. |
| 5,037,608 A | | 8/1991 | Tarcy et al. |
| 5,771,577 A | | 6/1998 | Gupta et al. |
| 6,004,620 A | | 12/1999 | Camm |
| 6,199,276 B1 | | 3/2001 | Siebert et al. |
| 6,210,488 B1 | * | 4/2001 | Bruce ...................... B08B 3/12 134/1 |
| 6,667,114 B2 | | 12/2003 | Grylls et al. |
| 6,749,396 B2 | * | 6/2004 | Barry ..................... F01D 5/186 415/115 |
| 6,847,004 B2 | * | 1/2005 | Das ................... B23K 26/0622 219/121.7 |
| 6,908,657 B2 | | 6/2005 | Farmer et al. |
| 7,204,019 B2 | * | 4/2007 | Ducotey, Jr. ............. B23H 9/10 29/402.06 |
| 7,411,150 B2 | * | 8/2008 | Lavers ..................... B23H 9/10 205/665 |
| 7,510,375 B2 | * | 3/2009 | Toppen ................ B05B 15/045 416/224 |
| 7,632,420 B2 | | 12/2009 | Thomas et al. |
| 7,645,123 B1 | | 1/2010 | Liang |
| 9,109,279 B2 | | 8/2015 | Chandra et al. |
| 2003/0037436 A1 | | 2/2003 | Ducotey et al. |
| 2003/0103108 A1 | | 6/2003 | Liu et al. |
| 2004/0156739 A1 | | 8/2004 | Song |
| 2009/0142548 A1 | | 6/2009 | Patterson et al. |
| 2009/0220349 A1 | | 9/2009 | Bolms et al. |
| 2010/0143655 A1 | | 6/2010 | Rosenzweig et al. |
| 2010/0224602 A1 | | 9/2010 | Helmick et al. |
| 2011/0293423 A1 | | 12/2011 | Bunker et al. |
| 2012/0051941 A1 | | 3/2012 | Bunker |

FOREIGN PATENT DOCUMENTS

| | | | |
|---|---|---|---|
| EP | 1103627 | A2 | 5/2001 |
| EP | 1437194 | A2 | 7/2004 |
| JP | 09158702 | A | 6/1997 |
| JP | 1054202 | A | 2/1998 |
| JP | 2000087701 | A | 3/2000 |
| JP | 2003155935 | A | 5/2003 |
| JP | 2009510302 | A | 3/2009 |
| JP | 2009178772 | A | 8/2009 |
| JP | 2011247248 | A | 12/2011 |
| JP | 2012052535 | A | 3/2012 |
| JP | 2013194667 | A | 9/2013 |

OTHER PUBLICATIONS

PCT Search Report and Written Opinion dated Feb. 11, 2014 from corresponding Application No. PCT/US2013/040257.

Unofficial English Translation of Japanese Search Report issued in connection with corresponding JP Application No. 2015520183 dated Mar. 9, 2017.

Unofficial English Translation of Japanese Office Action issued in connection with corresponding JP Application No. 2015520183 dated Mar. 21, 2017.

* cited by examiner

PROCESS FOR SELECTIVELY PRODUCING THERMAL BARRIER COATINGS ON TURBINE HARDWARE

CROSS REFERENCE TO RELATED APPLICATIONS

This application claims the benefit of U.S. Provisional Application Nos. 61/666,840, filed Jun. 30, 2012, and 61/666,838, filed Jun. 30, 2012, the contents of which are incorporated herein by reference.

BACKGROUND OF THE INVENTION

The present invention generally relates to selectively removing coatings from through-holes or slots in components. More specifically, the present invention relates to selectively removing a ceramic thermal barrier coating (TBC) from through-holes or slots in an airfoil component protected by the TBC.

Components located in certain sections of gas turbine engines, such as the turbine, combustor and augmentor section, are often thermally insulated with a ceramic layer in order to reduce their service temperatures, which allows the engine to operate more efficiently at higher temperatures. These coatings, often referred to as thermal barrier coatings (TBC), must have low thermal conductivity, strongly adhere to the article, and remain adherent throughout many heating and cooling cycles. Coating systems capable of satisfying these requirements typically include a metallic bond coat that adheres the thermal-insulating ceramic layer to the component, forming what may be termed a TBC system. Metal oxides, for example, zirconia ($ZrO_2$) partially or fully stabilized by yttria ($Y_2O_3$), magnesia (MgO) and/or other oxides, have been widely employed as thermal-insulating materials for the ceramic layers of TBC systems. The ceramic layers are typically deposited by thermal spray techniques, for example, air plasma spraying (APS), or a physical vapor deposition (PVD) technique such as electron beam physical vapor deposition (EBPVD). Bond coats are typically formed of an oxidation-resistant diffusion coating, such as a diffusion aluminide or platinum aluminide, or an oxidation-resistant overlay coating, such as of types often formed of an MCrAlX alloy (where M is iron, cobalt and/or nickel and X is yttrium, rare earth elements, and/or reactive elements.).

While TBC systems provide significant thermal protection to the underlying component substrate, internal cooling of components such as combustor liners and high pressure turbine (HPT) blades (buckets) and vanes (nozzles) is often necessary, and may be employed in combination with or in lieu of a TBC. Air-cooled components of a gas turbine engine often require that the cooling air flow is discharged through carefully configured cooling holes or slots that distribute a cooling film over the component surface to increase the effectiveness of the cooling flow. Cooling holes intended to provide a film cooling effect are often referred to as diffuser (trailing edge region) holes, and have shapes that increase in cross-section in the downstream direction to lower the velocity of the air exiting the hole at the component surface, thereby increasing the effectiveness of film cooling of the component surface. The efficiency of a cooling hole can be quantified by the discharge coefficient, $C_d$, which is the ratio of the effective area of a cooling hole based on flow measurements to the physical area of the hole. The effective area is less than the physical area as a result of surface conditions within the hole, including the entrance and exit of the hole, which provide resistance to air flow through the hole. Consequently, processes by which cooling holes are formed and configured are critical because the size, shape and surface conditions of each opening determine the amount of air flow exiting the opening and affect the overall flow distribution within the cooling circuit containing the hole.

For components that do not require a TBC, cooling holes are typically formed by such conventional drilling techniques as electrical-discharge machining (EDM) and laser machining, or with complex advanced casting practices that yield castings with dimensionally correct openings. EDM techniques cannot be used to form cooling holes in a component having a TBC since the ceramic is electrically nonconducting, and laser machining techniques are prone to spalling the brittle ceramic TBC by cracking the interface between the component substrate and the ceramic. Accordingly, cooling holes are often machined by EDM and laser drilling prior to applying the bond coat or the TBC. While it is typically desirable to deposit the bond coat inside the cooling holes for oxidation protection, the presence of TBC deposits in the cooling holes of an air-cooled component can detrimentally affect the service life of the component as a result of the TBC reducing the discharge coefficient by altering the shape and reducing the size of the cooling hole openings, and by insulating the metal from the cooling air as it exits. The obstruction of cooling holes with TBC not only occurs with new manufactured air-cooled components, but also occurs when refurbishing a TBC on a component returned from the field. During refurbishing, all of the existing bond coat and TBC are typically removed, after which a new bond coat and TBC are deposited with the result that cooling holes can be obstructed by deposits of the TBC material.

From the above, it can be seen that manufacturing and refurbishing an air-cooled component protected by a TBC is complicated by the requirement that the cooling holes remain appropriately sized and shaped. A typical solution is to mask the cooling holes to maintain their desired size and shape. For example, it is common practice to mask the trailing edge of a turbine blade so as to avoid depositing TBC within the cooling holes along its trailing edge. With this approach, an airfoil component lacks a TBC that would reduce the surface temperatures at its trailing edge.

Various techniques have been proposed for removing TBC from cooling holes. Japanese Laid-Open Patent No. Heisei 9-158702 discloses a process by which a high pressure fluid is introduced into the interior of an air-cooled component, such that the fluid flows out through the cooling hole openings and, in doing so, removes ceramic material that had blocked the cooling holes as a result of the component being coated with the ceramic material after the cooling hole was formed. Another technique is disclosed in U.S. Pat. No. 6,004,620 to Camm, in which ceramic accumulated in a cooling hole is removed with a jet projected toward the uncoated surface of the hole. While techniques of the types described above have been employed to remove ceramic deposits from cooling holes, an ongoing challenge concerns the ability to produce cooling holes having desirable aerodynamic properties, for example, as a result of avoiding damage to or otherwise modifying the surface characteristics of the cooling holes and their surrounding TBC during removal of ceramic deposits. This challenge applies to trailing edge region holes whose increasing cross-sectional shapes must be carefully controlled to achieve effective film cooling of a component surface.

BRIEF DESCRIPTION OF THE INVENTION

According to the present invention, a process of depositing a coating on an airfoil component, the component formed thereby, and a process for removing ceramic deposits within a hole in the airfoil component are provided. Particular but nonlimiting examples of the airfoil components are air-cooled components of gas turbine engines.

According to a first aspect of the invention, a process includes depositing a bond coat on an airfoil component including on a trailing edge region thereof that defines a trailing edge of the airfoil component, within holes located within the trailing edge region and spaced apart from the trailing edge, and on lands located within the trailing edge region and between the holes. A ceramic coating is then deposited on the bond coat including on the trailing edge region of the airfoil component, within the holes located within the trailing edge region, and on the lands between the holes. The ceramic coating within the holes is selectively removed without completely removing the ceramic coating on the trailing edge region and the lands between the holes.

According to a second aspect of the invention, an airfoil component includes a trailing edge region that defines a trailing edge of the airfoil component. Holes are located within the trailing edge region and spaced apart from the trailing edge. Lands are located within the trailing edge region and between the holes. A ceramic coating is on the trailing edge region of the airfoil component and on the lands between the holes but not within the holes.

According to a third aspect of the invention, a process includes obtaining an airfoil component comprising a bond coat on the airfoil component and a ceramic coating on the bond coat. Both the bond coat and the ceramic coating are on a trailing edge region the airfoil component that defines a trailing edge thereof, within the holes located within the trailing edge region and spaced apart from the trailing edge, and on lands located within the trailing edge region and between the holes. The ceramic coating within the holes is selectively removed without completely removing the ceramic coating on the trailing edge region and the lands between the holes.

Another aspect of the invention is an airfoil component formed by the processes described above wherein the ceramic coating is selectively removed without completely removing the bond coat from the holes.

A technical effect of the invention is the ability to coat a larger portion of an air-cooled component with a thermal-insulating ceramic material, while also eliminating deposits of the ceramic material within holes in the component. As a nonlimiting example, the present invention provides the capability of coating the entire airfoil portion of a turbine blade, including its trailing edge in which cooling holes are present, without significantly reducing the effectiveness of the cooling holes such that the trailing edge and the blade as a whole are capable of withstanding higher operational temperatures.

Other aspects and advantages of this invention will be better appreciated from the following detailed description.

DETAILED DESCRIPTION OF THE INVENTION

Figure 1:
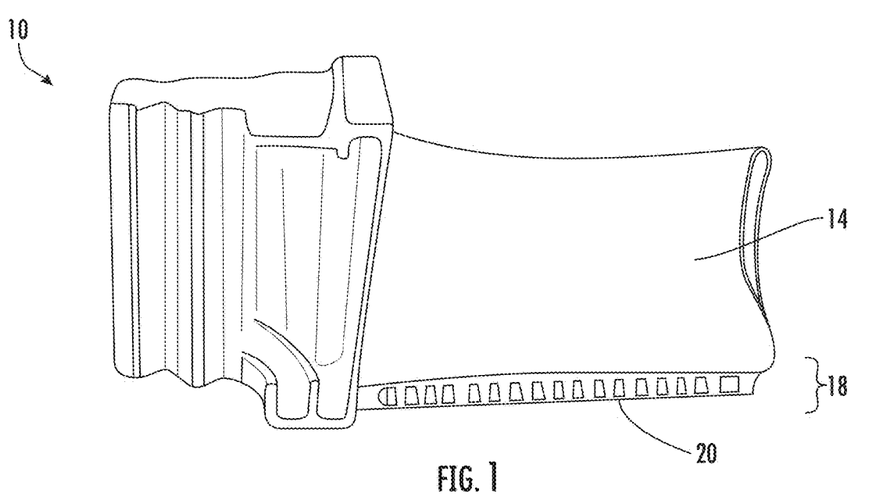
FIG. 1 depicts a HPT blade having a TBC deposited by a conventional prior art method to coat all but the trailing edge of its airfoil portion, and for comparison

This invention is a process by which a ceramic coating can be deposited on a surface of a component, but subsequently removed from holes in the surface. In a particular example, an HPT blade 10 is represented in FIG. 1 as comprising a trailing edge region 18 that defines a trailing edge 20 of an airfoil portion of the blade 10. As presented in FIG. 2, a ceramic coating (TBC) 14 can be deposited on the trailing edge region 18 of the blade 10, including lands 22 located within the trailing edge region 18 and between cooling holes (slots) 24, but removed from the holes 24 so as not to negatively impact their performance.

According to a preferred embodiment of the invention, the TBC 14 can be deposited on the entire airfoil of the blade 10, including the trailing edge 20 and trailing edge region 18. Afterwards, an ablative laser beam is used to selectively remove (etch) the TBC 14 from the holes 24 of the trailing edge region 18. The ablative laser beam is preferably generated with a laser generator (not shown) whose operating parameters are controlled and which utilizes a raster pattern capable of selectively projecting the laser beam onto surfaces of the trailing edge region 18 from which the TBC 14 is intended to be partially or completely removed. Suitable means for achieving this are known to those skilled in methods of graphical identification and control programs, and therefore will not be discussed in any detail here. According to a preferred aspect of the invention, the TBC 14 can be selectively removed to cause minimal or no damage to any bond coat 16 on which the TBC 14 is deposited. It is believed to be desirable for the bond coat 16 to remain to provide oxidation protection to the metal surfaces that define the cooling holes 24.

Figure 2:
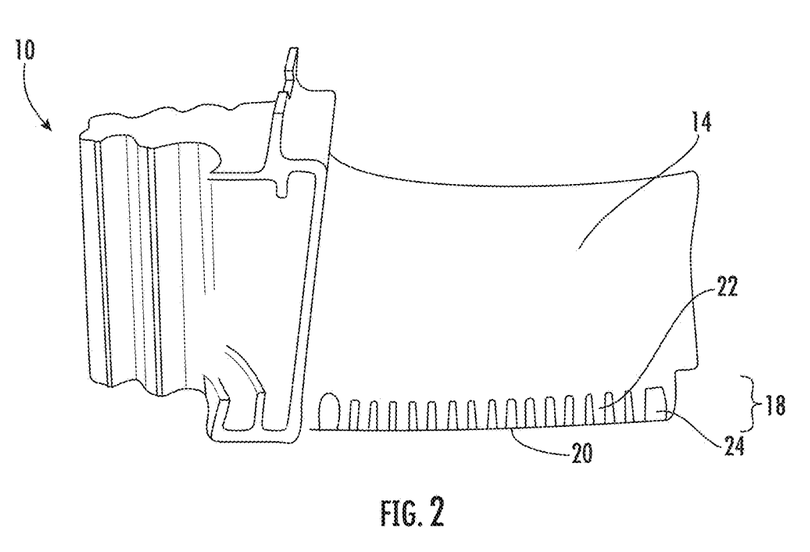
FIG. 2 depicts a HPT blade having a TBC that coats the entire airfoil portion of the blade but is absent from cooling holes along its trailing edge.

Benefits of the present invention can be appreciated by comparing FIGS. 1 and 2, which show two essentially identical HPT blades 10. FIG. 1 depicts the result of coating a blade 10 according to conventional practice, wherein dark surface areas corresponding to the trailing edge region 18 of the blade 10 are not coated by TBC 14 (seen as lighter surface areas of the blade 10). As such, the trailing edge region 18 is not thermally protected by the TBC 14. In contrast, the entirety of the airfoil portion of the blade 10 depicted in FIG. 2, including the trailing edge region 18 and the lands 22 between the holes 24, are protected by a TBC 14, the sole exception being the holes 24 within the trailing edge region 18. This significantly reduces heating loads on the airfoil surfaces of the blade 10.

Figure 5:
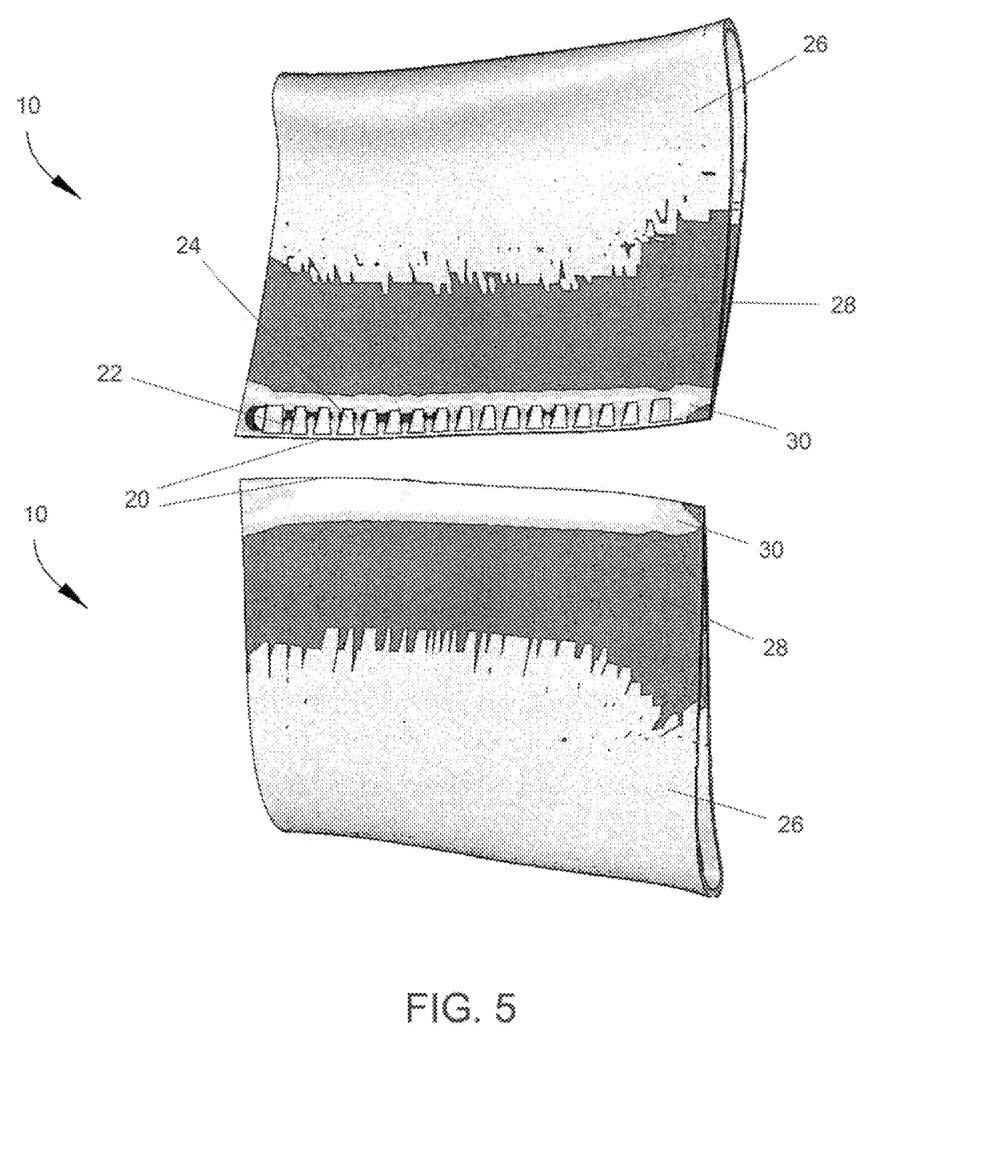
FIG. 5 represents reductions in heating loads over surfaces of an airfoil portion that can be achieved with the present invention.

FIG. 5 illustrates the reduction in heating loads due to this process. The shading across the surfaces of the blade 10 changes as a representation of the drop in temperature relative to two oppositely-disposed surface regions 26 of the blade 10, each extending downstream from a leading edge of the blade 10. Two oppositely-disposed surface regions 28 located downstream of the surface regions 26 are represented as having temperatures of about 0° C. to 20° C. lower than the regions 26, and two oppositely-disposed surface regions 30 located downstream of the surface regions 28 are represented as having temperatures of more than 20° C. lower than the regions 26. As can be seen, the heating reductions extend across the entire surface of the airfoil, including the trailing edge region 18, trailing edge 20 and lands 22 encompassed by the coolest surface regions 30. These results relate to improved endurance performance of the blade 10 and a potential savings of 8% of the overall airfoil cooling flow.

Figure 3:
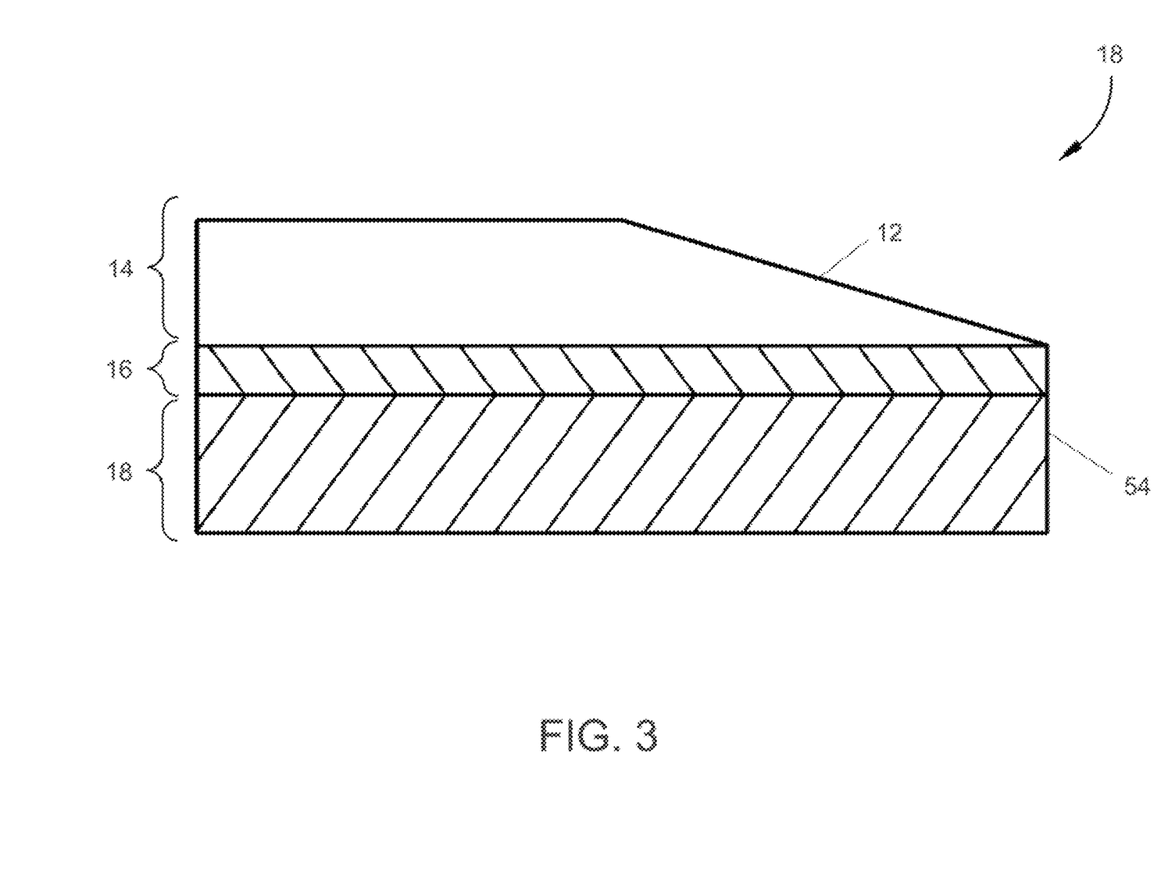
FIG. 3 depicts a cross-sectional representation of a TBC coating a surface of a HPT blade near a cooling hole in accordance with an aspect of this invention.
Figure 4:
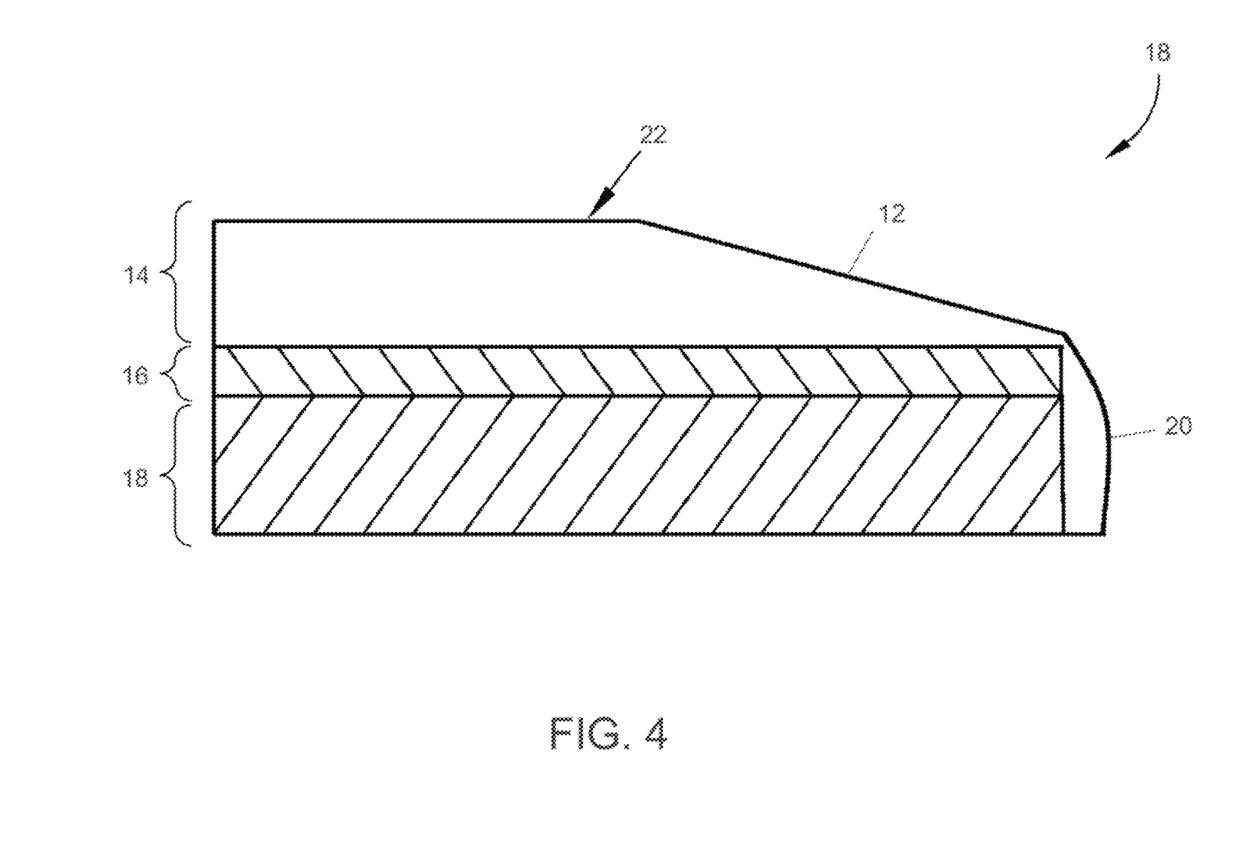
FIG. 4 depicts a cross-sectional representation of a TBC coating a surface of a HPT blade near a land between adjacent cooling holes in accordance with an aspect of this invention.

In preferred embodiments of the invention, etching performed by the abrasive laser can be used to taper the TBC 14 around the cooling holes 24, for example, to reduce mixing of the hot gases around the turbine blade 10 with the cooling air from the cooling holes 24. It is believed that a relatively sharp change in the thickness of the TBC 14 between surfaces tends to create turbulence and mixing of the gases. Consequently, it is preferred that the thickness of the TBC 14 is reduced gradually as the TBC 14 approaches the cooling holes 24. In addition, the TBC 14 can be tapered near the trailing edge 20 so that the thickness of the TBC 14 is reduced gradually as the TBC 14 approaches the trailing edge 20. It is believed that minimizing the thickness of the trailing edge of the blade 10 improves aerodynamic properties of the airfoil portion of the blade 10. FIGS. 3 and 4 represent exemplary taper regions 12 near an upstream wall 54 of a cooling hole 24 and a land 22, respectively. As represented, the TBC 14 may be tapered to gradually decrease in thickness approaching the upstream wall of the cooling holes 24 and the trailing edge 20.

Figure 8:
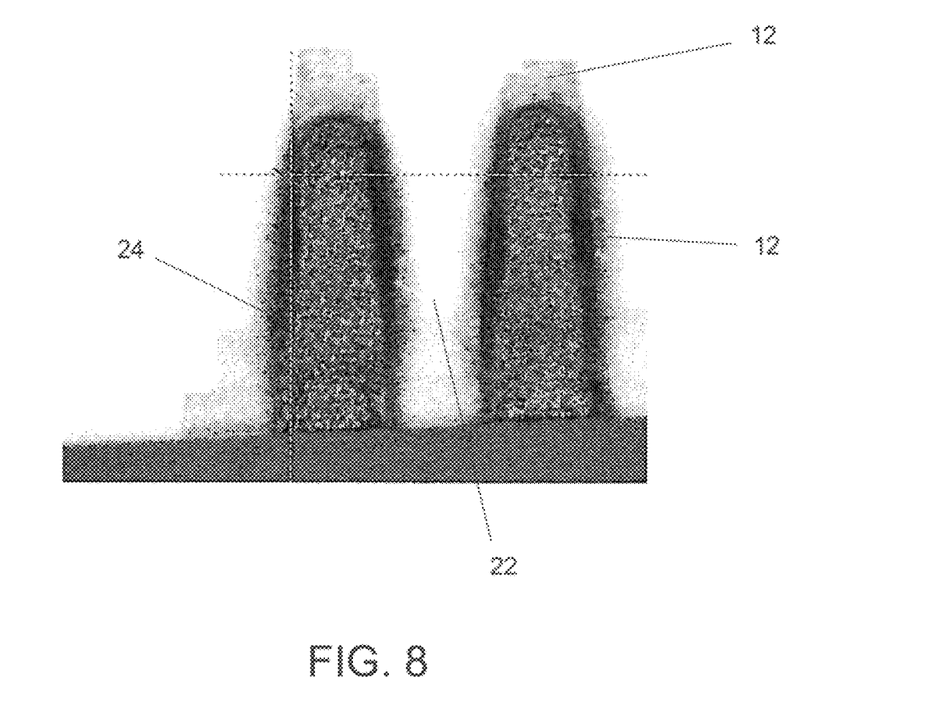
FIG. 8 depicts two cooling holes located at a trailing edge region of a HPT blade, and shows the TBC as being tapered in two locations adjacent each of the cooling holes.

FIG. 8 depicts the results of tapering performed by the current process. Tapered regions 12 surrounding the holes 24 are defined by darker contrast areas. The tapered regions 12 are shown along edges of the holes 24 as well as upstream of the holes 24 and trailing edge 20.

Figure 6:
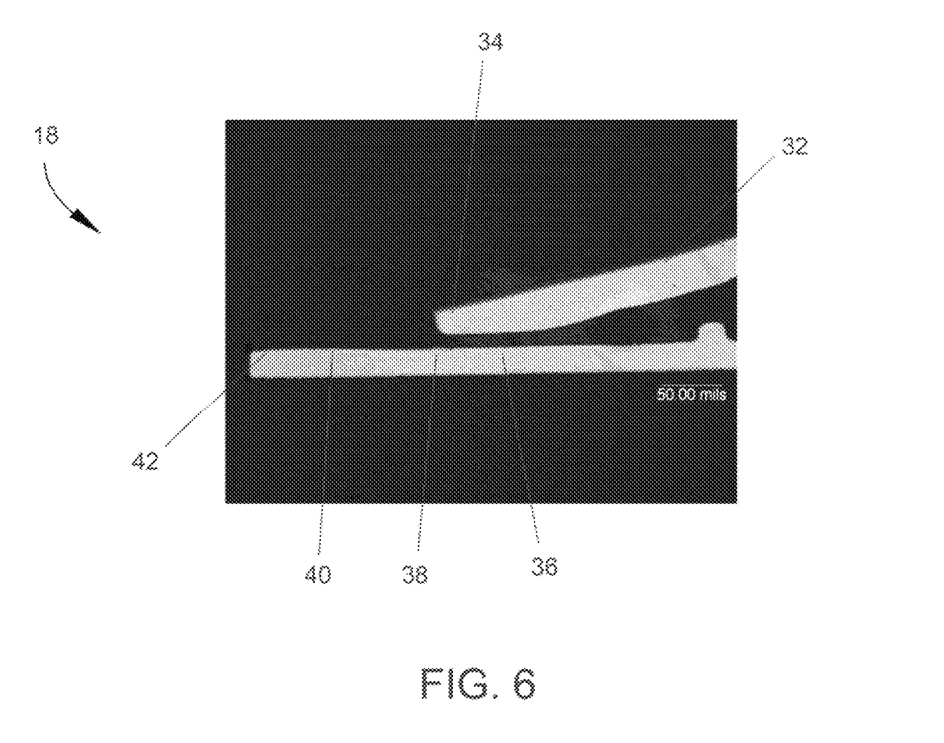
FIGS. 6 and 7 depict cross-sections of a trailing edge region of a HPT blade, and shows a TBC as not coating a cooling hole (FIG. 6) but coating a land between adjacent cooling holes (FIG. 7).
Figure 7:
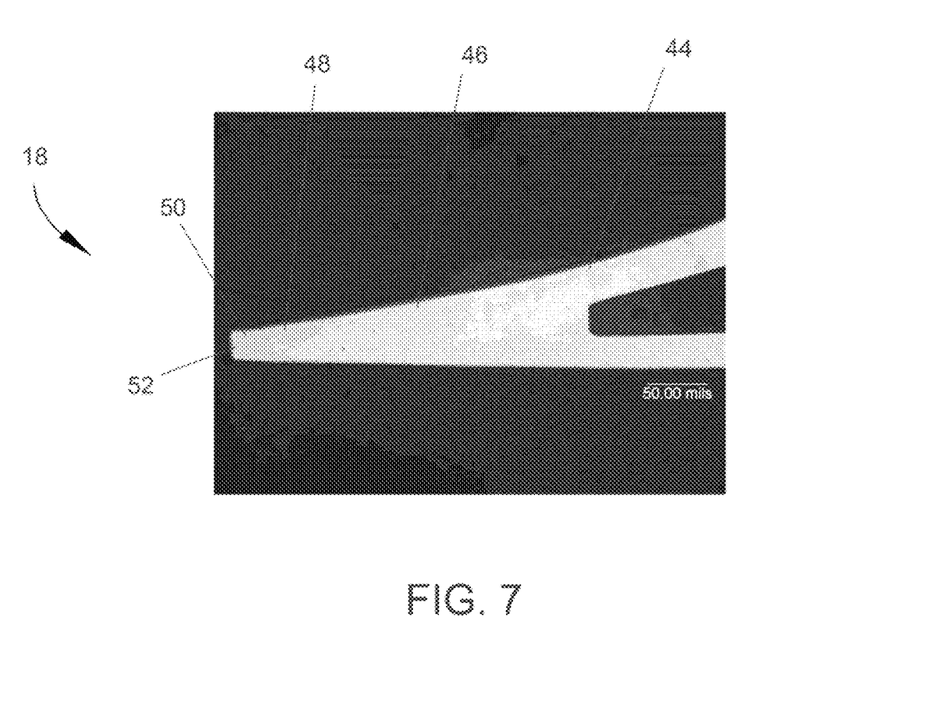

FIGS. 6 and 7 are scanned images showing cross-sectional views the trailing edge region 18 of a blade 10. FIG. 6 shows a section with a cooling hole 24 and FIG. 7 shows a section with a land 22. Referring to FIG. 6, the TBC 14 on the blade 10 has a thickness that is preferably full near point 32 (that is, about the same thickness as coated portions of the blade 10 that are not tapered), thinner near point 34, and completely removed near points 36, 38, 40, and 42. Referring to FIG. 7, the TBC 14 on the blade 10 has a thickness that is preferably full near points 44, 46, and 48, thinner near point 50, and full near point 52. Preferably, the TBC 14 is tapered or completely removed at these points without causing significant damage to any layers underlying the TBC 14, such as a bond coat 16. Current trials have shown that TBC 14 removal and tapering in this manner does not damage the microstructure of adjacent TBC 14.

Figure 9:
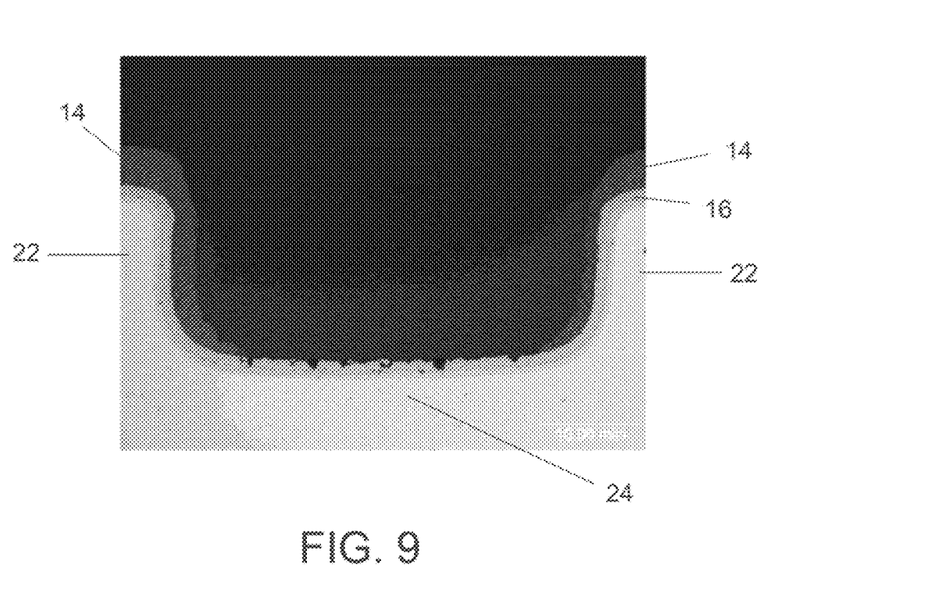
FIG. 9 depicts a cross-section of a trailing edge region of a HPT blade, and shows a TBC as not coating a cooling hole but coating lands adjacent to the cooling hole with the TBC being tapered along sides of the lands.

FIG. 9 is a scanned image showing a cross-sectional view of a cooling hole 24 and adjacent lands 22 that have been etched by the above described process. As represented, the TBC 14 has been removed from the hole 24 and tapered along the walls sides of the adjacent lands 22 that define the walls of the hole 24 so that the thickness of the TBC 14 decreases from the sides of the lands 22 towards a lower portion of the hole 24. A bond coat 16 deposited between the TBC 14 and the surface of the blade 10 is depicted as remaining intact after completion of the etching process in accordance with a preferred aspect of the invention. As stated previously, retaining the bond coat 16 within the hole 24 will likely provide oxidation protection to the hole 24.

According to another aspect of this invention, a blade 10 can be produced to have advantageous characteristics as a result of the process described above. For example, the ability to deposit TBC 14 on the entire airfoil, including the trailing edge region 18, is an advantageous feature. As a result of this feature, the cooling flow requirements for the blade 10 can be significantly reduced. Current testing indicates a stage 1 blade a potential savings of 8% of the overall airfoil cooling flow.

While the invention has been described in terms of specific embodiments, it is apparent that other forms could be adopted by one skilled in the art. For example, the physical configuration of the blade 10, cooling holes 24, and lands 22 could differ from that shown, and the types of coatings on the surface of the blade 10 could differ than those noted. Therefore, the scope of the invention is to be limited only by the following claims.

The invention claimed is:

1. A process comprising:
    depositing a bond coat on an airfoil component including on a trailing edge region thereof that defines a trailing edge of the airfoil component, within holes located within the trailing edge region and spaced apart from the trailing edge, and on lands located within the trailing edge region and between the holes;
    depositing a ceramic coating on the bond coat including on the trailing edge region of the airfoil component, within the holes located within the trailing edge region, and on the lands between the holes; and then
    selectively removing the ceramic coating within the holes without completely removing the ceramic coating on the trailing edge region and the lands between the holes and without completely removing the bond coat from the holes.

2. The process according to claim 1, wherein the selectively removing step is performed with an ablative laser.

3. The process according to claim 1, wherein the ceramic coating is selectively removed from the trailing edge region to taper the ceramic coating so that the thickness of the ceramic coating upstream of each of the holes decreases in a downstream direction toward each of the holes.

4. The process according to claim 1, wherein the ceramic coating is selectively removed from the lands between the holes to taper the ceramic coating so that the thickness of the ceramic coating on the lands decreases in a downstream direction toward the trailing edge.

5. The process according to claim 1, wherein the holes are cooling holes of the component.

6. The process according to claim 2, wherein at least one of the holes has a shape that increases in cross-section in a downstream direction toward the trailing edge.

7. The process according to claim 1, wherein the component is a high pressure turbine blade.

8. The process according to claim 1, wherein the ceramic coating is selectively removed without completely removing the bond coat from the trailing edge region, and the lands between the holes.

9. The process according to claim 1, wherein the ceramic coating is selectively removed without damaging the bond coat in the holes, on the trailing edge region, and on the lands between the holes.

10. The airfoil component produced by the process of claim 1.

11. A process of forming the ceramic coating on an airfoil component, the airfoil component having a trailing edge region that defines a trailing edge of the airfoil component, holes located within the trailing edge region and spaced apart from the trailing edge, lands located within the trailing edge region and between the holes, a bond coat on surfaces of the airfoil component within the holes, and a ceramic coating on the trailing edge region of the airfoil component and on the lands between the holes but not within the holes, the process comprising:

depositing a bond coat on the airfoil component including on a trailing edge region thereof that defines a trailing edge of the airfoil component, within holes located within the trailing edge region and spaced apart from the trailing edge, and on lands located within the trailing edge region and between the holes;

depositing a ceramic coating on the bond coat including on the trailing edge region of the airfoil component, within the holes located within the trailing edge region, and on the lands between the holes; and then selectively removing the ceramic coating within the holes with an ablative laser without completely removing the ceramic coating on the trailing edge region and the lands between the holes.

12. A process comprising:

obtaining an airfoil component comprising a bond coat on the airfoil component, including on a trailing edge region the airfoil component that defines a trailing edge thereof, within the holes located within the trailing edge region and spaced apart from the trailing edge, and on lands located within the trailing edge region and between the holes, and a ceramic coating on the bond coat including on the trailing edge region of the airfoil component, within the holes located within the trailing edge region, and on the lands between the holes; and then selectively removing the ceramic coating within the holes without completely removing the ceramic coating on the trailing edge region and the lands between the holes and without completely removing the bond coat from the holes.

\* \* \* \* \*